United States Patent
Guzik et al.

(10) Patent No.: US 8,210,554 B2
(45) Date of Patent: Jul. 3, 2012

(54) BICYCLE FRAME HAVING A MULTIPLE STEP AND LAP JOINT

(75) Inventors: David Guzik, Madison, WI (US); Christopher Pomering, Sun Prairie, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 524 days.

(21) Appl. No.: 12/499,958

(22) Filed: Jul. 9, 2009

(65) Prior Publication Data

US 2011/0006501 A1 Jan. 13, 2011

(51) Int. Cl.
   *B62K 19/00* (2006.01)
(52) U.S. Cl. .............. 280/274; 280/281.1; 280/288.2; 280/288.3
(58) Field of Classification Search ............ 280/274, 280/281.1, 288.2, 288.3; 156/78, 79, 245; 29/525.01, 897.2; 403/358, 356
   See application file for complete search history.

(56) References Cited

U.S. PATENT DOCUMENTS

| | | | |
|---|---|---|---|
| 3,865,403 A | 2/1975 | Majerus | |
| 3,937,641 A | 2/1976 | Kushner et al. | |
| 4,108,700 A | 8/1978 | Clodfelter | |
| 4,145,068 A | 3/1979 | Toyomasu et al. | |
| 4,479,662 A | 10/1984 | Defour et al. | |
| 4,541,649 A | 9/1985 | Griinfeld | |
| 4,657,795 A * | 4/1987 | Foret | 280/281.1 |
| 4,721,407 A | 1/1988 | Liu | |
| 4,828,781 A | 5/1989 | Duplessis et al. | |
| 4,846,490 A | 7/1989 | Hashimoto et al. | |
| 4,856,800 A | 8/1989 | Hashimoto et al. | |
| 4,889,355 A | 12/1989 | Trimble | |
| 4,900,050 A | 2/1990 | Bishop et al. | |
| 4,902,160 A | 2/1990 | Jeng | |
| 4,986,949 A | 1/1991 | Trimble | |
| 5,019,312 A | 5/1991 | Bishop | |
| 5,059,054 A | 10/1991 | Del Campo | |
| 5,076,601 A | 12/1991 | Duplessis | |
| 5,122,210 A | 6/1992 | Kubomura et al. | |
| 5,158,733 A | 10/1992 | Trimble | |
| 5,271,784 A | 12/1993 | Chen et al. | |
| 5,368,804 A * | 11/1994 | Hwang et al. | 264/258 |
| 5,404,630 A | 4/1995 | Wu | |
| 5,431,870 A | 7/1995 | Andre | |
| 5,451,071 A | 9/1995 | Pong et al. | |
| 5,498,096 A | 3/1996 | Johnson | |
| 5,511,831 A | 4/1996 | Barton | |

(Continued)

FOREIGN PATENT DOCUMENTS

EP 0812761 A2 12/1997

(Continued)

*Primary Examiner* — Anne Marie Boehler
*Assistant Examiner* — Marlon Arce
(74) *Attorney, Agent, or Firm* — Boyle Fredrickson, S.C.

(57) ABSTRACT

A bicycle frame assembly that includes at least one joint having a number of steps and laps formed between adjoining frame members. A first frame member includes a male portion of the joint and has at least three steps that are separated by rises between adjacent steps formed on an exterior surface of the first frame member. A second frame member includes a female portion of the joint and has the same number of steps and rises as the first frame member formed on an interior surface of the second frame member. The steps and rises of the first and second frame members are constructed and orientated so that the first frame member slidably cooperates with the second frame member to form a continuous multi-directional joint therebetween.

20 Claims, 2 Drawing Sheets

U.S. PATENT DOCUMENTS

| | | |
|---|---|---|
| RE35,335 E | 9/1996 | Calfee |
| 5,865,456 A | 2/1999 | Busby et al. |
| 5,984,369 A | 11/1999 | Crook et al. |
| 6,123,353 A | 9/2000 | Bennett et al. |
| 6,139,040 A | 10/2000 | Dempsey |
| 6,264,878 B1 | 7/2001 | Busby |
| 6,270,104 B1 | 8/2001 | Nelson et al. |
| 6,340,509 B1 * | 1/2002 | Nelson et al. ............. 428/34.7 |
| 6,375,210 B1 | 4/2002 | Lam |
| 6,742,796 B2 | 6/2004 | Ho et al. |
| 6,761,187 B1 | 7/2004 | Zoellner |
| 6,994,367 B2 * | 2/2006 | Mock et al. ............. 280/288.1 |
| 6,994,379 B2 | 2/2006 | Zoellner |
| 7,052,028 B2 | 5/2006 | Chamberlain |
| 7,322,106 B2 | 1/2008 | Marando et al. |
| 2004/0130122 A1 * | 7/2004 | Chang .................. 280/281.1 |
| 2007/0079930 A1 | 4/2007 | Parkin |

FOREIGN PATENT DOCUMENTS

| | | |
|---|---|---|
| EP | 1958760 A2 | 8/2008 |

* cited by examiner

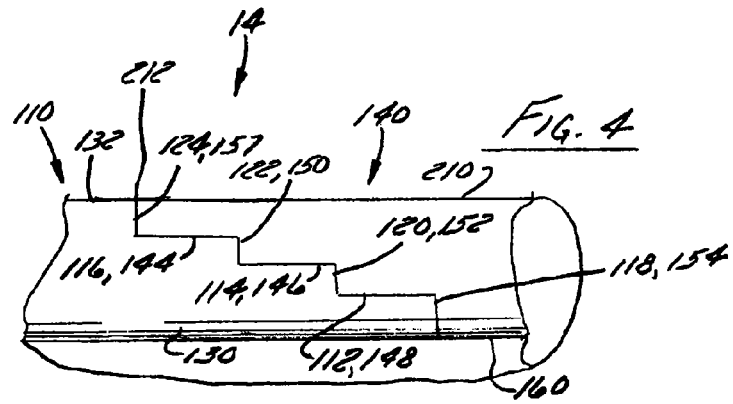
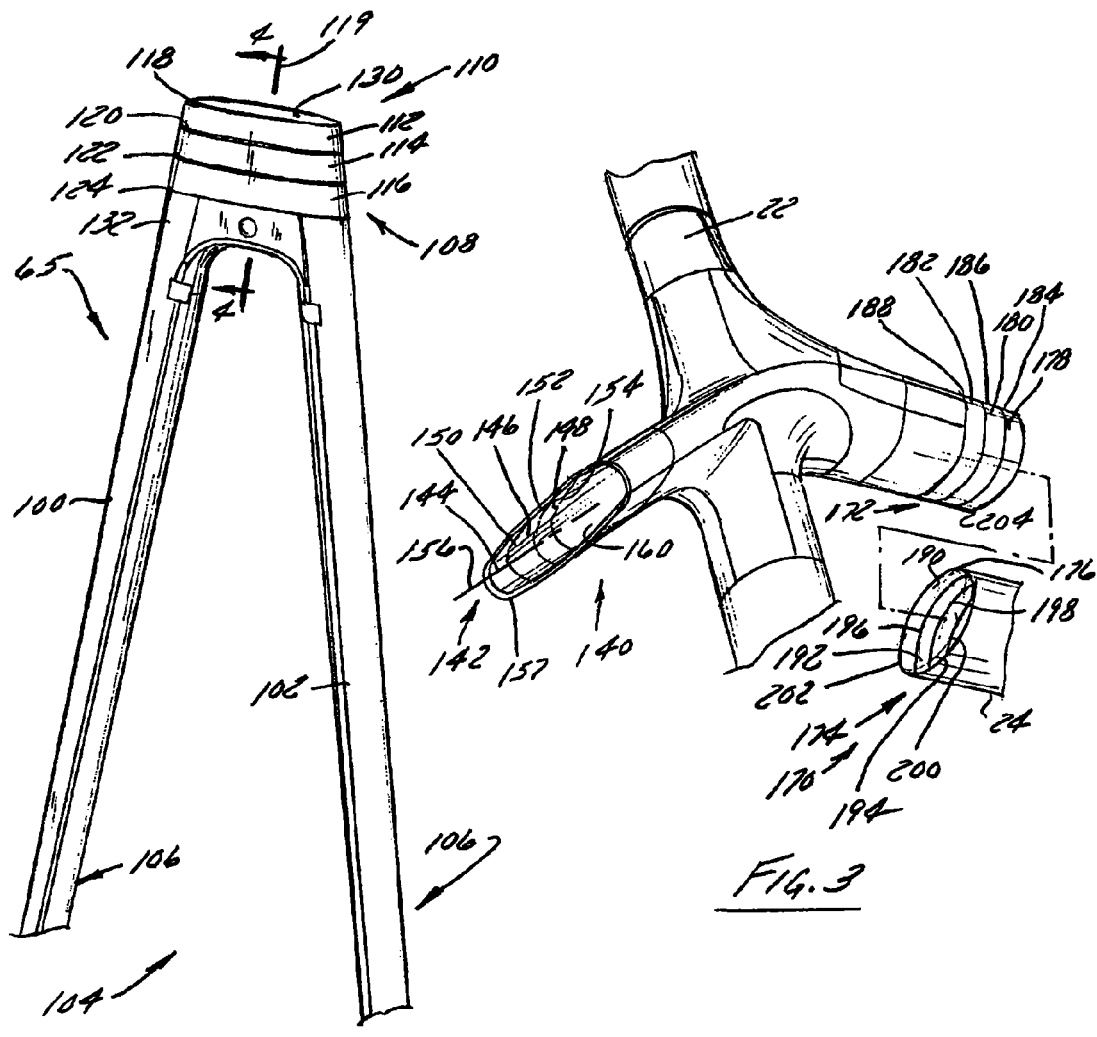

BICYCLE FRAME HAVING A MULTIPLE STEP AND LAP JOINT

BACKGROUND OF THE INVENTION

The present invention relates generally to bicycles and, more particularly, to bicycle frame constructions wherein one or more members of the bicycle frame are joined together during manufacture.

The primary structural component of a conventional two-wheel bicycle is the frame. On a conventional road bicycle, the frame is typically constructed from a set of tubular members assembled together to form the frame. For many bicycles, the frame is constructed from members commonly referred to as the top tube, down tube, seat tube, seat stays and chain stays, and those members are joined together at intersections commonly referred to as the head tube, seat post, bottom bracket and rear dropout. As is commonly understood, it is occasionally more convenient to attach some of the members of the frame assembly to form subassemblies before the final assembly of all of the respective components.

The top tube usually extends from the head tube rearward to the seat tube. The head tube, sometimes referred to as the neck, is a short tubular structural member at the upper forward portion of the bicycle which supports the handlebar and front steering fork. The front wheel assembly is commonly supported between the legs of the front steering fork. The down tube usually extends downwardly and rearward from the head tube to the bottom bracket. The bottom bracket usually comprising a cylindrical member for supporting the pedals and chain drive mechanism which powers the bicycle. The seat tube usually extends from the bottom bracket upwardly to where it is joined to the rear end of the top tube. The seat tube also usually functions to telescopically receive a seat post for supporting a seat or saddle for the bicycle rider to sit on.

The chain stays normally extend rearward from the bottom bracket. The seat stays normally extend downwardly and rearward from the top of the seat tube. The chain stays and seat stays are normally joined together proximate a rear dropout and support the rear axle of the rear wheel assembly. Those skilled in the art will readily appreciate that the foregoing description represents one conventional construction of a bicycle frame. Many metal framed bicycles included one or more frame tubes that are simply welded together at designated locations. Those skilled in the art will also appreciate that the materials and material constructions associated with forming such a metal framed bicycle form a substantial portion of the overall weight of the resultant bicycle.

There is an ever present desire to reduce the weight of the bicycle frame so as to improve rider performance. Many manufacturers have recognized the use of carbon fiber materials as a viable lightweight replacement for metal based bicycle frame constructions. Still others have altered the composition of the metal based materials to achieve desired weight to strength ratios. Regardless of the material of the bicycle frame, one issue that remains problematic is the formation of the connection between the respective frame members.

Altering the shape and contour of the ends of the frame members alters the strength and performance of the bicycle frame. To provide the necessary structural integrity between the respective frame members, some manufacturers provide a connection wherein the respective frame members are secured together with extraneous connectors. Others form a wrapped joint wherein a wrapping material is wound about the interface of the ends of the respective frame members. Such methodologies complicate the assembly and manufacture processes and require supplemental connectors as well as skilled labor for forming and finishing such joints in a desired manner. Furthermore, such joint assemblies also present a weight penalty to the overall construction of the bicycle frame.

A joint construction having inadequate performance can lead to premature frame failure and/or undesired blemishes. During use, stresses supported by the frame of the bicycle are commonly concentrated at the jointed locations. Many joints have one joint member that is more rigid and/or capable of supporting a greater load than the other joint member. The construction of the respective ends of the joined members as well as the location of the joint with respect to the bicycle frame affect the ability of the respective ends to withstand the in-use load communicated across the joint. Commonly, inadequate joint constructions are evidenced by blemishes in the finish of the bicycle frame as the paint and/or other frame finishes crack or peel due to the non-uniform transmission of loads across the joint. Providing a unitary bicycle frame would resolve the issues associated with joint blemish and the increased weight associated with such frame joints however, such an approach would complicate the manufacturing processes associated with forming such a bicycle frame.

Therefore, there is a need for a bicycle frame joint system that does not unduly increase the weight of the resultant bicycle frame and which can tolerate the forces associated with operation of the bicycle in a manner that reduces incidents of finish blemishes. The present invention discloses such a bicycle frame joint system.

BRIEF DESCRIPTION OF THE INVENTION

The present invention provides a bicycle frame joint system that overcomes one or more of the aforementioned drawbacks. One aspect of the invention is directed to bicycle frame assembly that includes at least one joint having a number of steps and laps formed between adjoining frame members. A first frame member includes a male portion of the joint and has at least three steps that are separated by rises between adjacent steps formed on an exterior surface of the first frame member. A second frame member includes a female portion of the joint and has the same number of steps and rises as the first frame member. Unlike the first frame member, the steps and rises of the second frame member are formed on an interior surface of the second frame member. The steps and rises of the first and second frame members are constructed and orientated so that the first frame member slidably cooperates with the second frame member to form a continuous multidirectional joint therebetween.

Another aspect of the invention that includes one or more of the aspects discussed above discloses a bicycle frame assembly having a seat tube and a head tube that is generally aligned with and horizontally offset from the seat tube. The frame assembly includes at least one horizontal tube that extends between the seat tube and the head tube and a seat stay assembly that extends rearward from the seat tube. A chain stay extends rearward from the seat tube at a position generally under the seat stay. The frame assembly includes a joint that is formed between at least two of the seat tube, head tube, horizontal tube, seat stay assembly and chain stay. The joint includes a male portion and a female portion that can overlap one another. The male portion has at least three steps of gradually increasing diameter as determined in a direction moving away from a distal end of the male portion. Each step is separated by a rise that is generally perpendicular to, and formed between, adjacent steps. The joint includes a female portion having at least three steps that are each separated by a rise. The steps and rises of the female portion are oriented in a substantially similar manner as the steps and rises of the male portion so that both of the steps and the rises of the male and female portion can be bonded, glued, cemented, joined securely, or otherwise cohered together.

A further aspect of the invention incorporating one or more of the aspects above discloses a bicycle assembly that has a seat, a handlebar, a rear wheel positioned proximate the seat, and a front wheel positioned proximate the handlebar. The bicycle assembly includes a frame that is formed by a number of connected members that support the seat, the handlebar, the rear wheel, and the front wheel. A joint is formed between at least two of the connected members and is formed by a first portion and a second portion that cooperate with one another in a telescopic manner. The joint includes a first, a second, and a third shelf that are formed along an outer surface of the first portion and have gradually increasing circumferences in a direction away from a distal end of the first portion. A fourth, a fifth, and a sixth shelf are formed along an inner surface of the second portion and have gradually reducing circumferences in a direction away from a distal end of the second portion. A wall is formed between each adjacent shelf such that each wall and each shelf of the first portion can be bonded to a corresponding shelf and a corresponding wall of the second portion.

A further aspect of the invention usable with one or more of the aspects above discloses a method of forming a bicycle frame having a number of connected members that include a top tube, a bottom tube, a seat tube, a pair of seat stays and a pair of chain stays. The method includes providing a first frame member having an end portion whose cross-sectional shape gradually reduces in a direction toward a distal end of the first frame member in a tapered manner from an outer surface to a first step surface, from the first step surface to a second step surface, from the second step surface to a third step surface, and from the third step surface to an interior surface of the first frame member. A ridge is formed between each of the outer, first, second, and third step surfaces, and the third step surface and the interior surface so that each ridge extends in a direction that is generally transverse to adjacent surfaces. A second frame member is provided that includes an end portion constructed to snuggly receive the end portion of the first frame member. The end portion has an opening whose cross-sectional shape gradually reduces in a direction away from a distal end of the second frame member so that an outer surface of the second frame member is aligned with the outer surface of the first frame member and an interior surface of the second frame member is aligned with the interior surface of the first frame member. Each of the first, second, and third surfaces and each ridge of the first frame member are bonded to a corresponding surface of the second frame member so that the interior and exterior surfaces of the joint are generally continuous and coplanar with respect to the bonded frame members.

Another aspect of the invention useable with one or more of the above aspects includes forming each of the male and female portions of the joint to have a generally, non-circular, elliptical, or oblong cross-section shape. Preferably, one or both of the joined frame members are hollow. In another preferred aspect, similar joint assemblies are formed between the seat stay assembly and the seat tube and between the seat tube and a forward extending generally horizontal tube of the bicycle frame assembly. In such assembly, the seat stay includes a rearward extending female potion of one joint and a forward extending male or female portion of a second joint. Preferably, the male and female portions of each respective joint are constructed of the same material.

In a preferred aspect combinable with one or more of the above aspects, each step has a length that is greater than a length of an adjacent rise. More preferably, each step is about two times to about seven times longer than an adjacent rise. Preferably, each rise extends in a crossing direction relative to the adjacent steps and more preferably, each rise is generally transverse to the adjacent steps. Preferably, each of the steps and each of the rises have a common length or depth, respectively.

It is appreciated that the aspects and features of the invention summarized above are not limited to any one particular embodiment of the invention. That is, many or all of the aspects above may be achieved with any particular embodiment of the invention. Those skilled in the art will appreciate that the invention may be embodied in a manner preferential to one aspect or group of aspects and advantages as taught herein. These and various other aspects, features, and advantages of the present invention will be made apparent from the following detailed description and the drawings.

BRIEF DESCRIPTION OF THE DRAWINGS

The drawings illustrate preferred embodiments presently contemplated for carrying out the invention.

FIG. 2 is a perspective view of a seat stay assembly of the bicycle frame assembly shown in FIG. 1 and shows a first or male portion of a frame joint assembly positioned at an end thereof;

FIG. 3 is rear perspective view of a seat tube assembly of the bicycle frame assembly shown in FIG. 1 and shows a second or female portion of a frame joint assembly that cooperates with the male portion of the joint assembly shown in FIG. 4; and FIG. 4 is a radial cross-sectional view of an assembled joint taken along axis 4-4 shown in FIG. 2.

DETAILED DESCRIPTION OF THE PREFERRED EMBODIMENT

Figure 1:
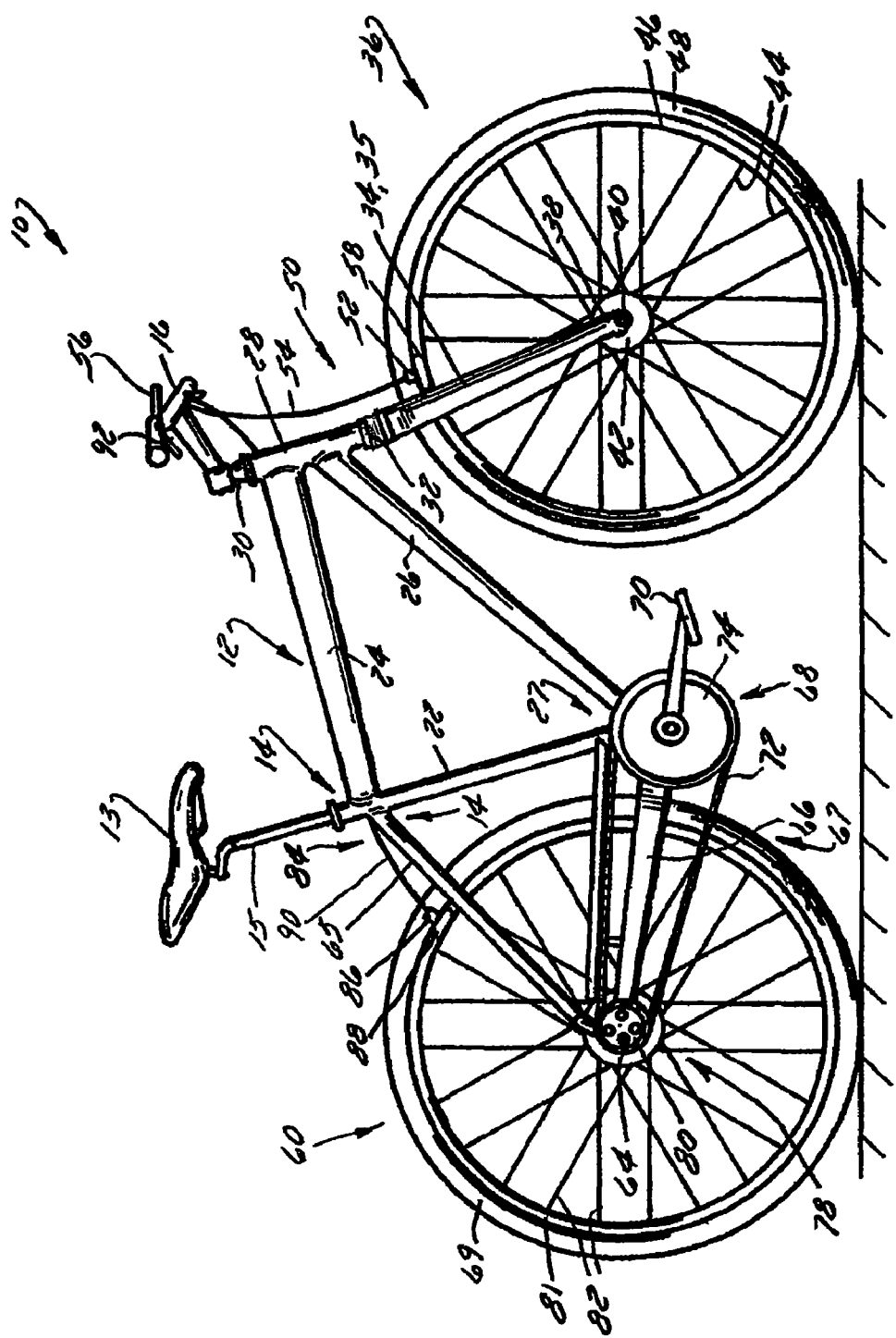
FIG. 1 is an elevational view of a bicycle equipped with a bicycle frame assembly having a number of frame joints according to the present invention.

FIG. 1 shows a bicycle 10 equipped with a frame assembly 12 having a number of joints 14 that are formed according to the present invention. Bicycle 10 includes a seat 13 that is supported by a seat post 15 and handlebars 16 that are attached to frame assembly 12. Seat post 15 telescopically cooperates with a seat tube 22 of frame assembly 12 and allows adjustment of the height of seat 13. Frame assembly 12 includes a top tube 24 and a down tube 26 that extend forward from seat tube 22 to a head tube 28 of frame assembly 12. A bottom bracket 27 is positioned generally behind a pedal set and disposed proximate the connection of seat tube 22 and down tube 26.

Handlebars 16 are connected to a steerer tube 30 that passes through head tube 28 and engages a fork crown 32. A pair of forks 34, 35 extend from generally opposite ends of fork crown 32 and are constructed to support a front wheel assembly 36 at an end or fork tip 38 associated with each fork 34, 35. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

A front brake system 50 includes a caliper 52 that is positioned to generally flank rim 46. A cable 54 connects caliper 52 to a front brake lever 56 that is positioned proximate handlebar 16. A pair of brake pads 58 are positioned on generally opposite sides of rim 46 and connected to caliper 52 so that operation of brake lever 56 biases brake pads 58 into engagement with rim 46 of front wheel assembly 36.

Bicycle 10 includes a rear wheel assembly 60 that is attached to frame assembly 12 by a rear axle 64. A pair of seat stays or seat stay assembly 65 and a pair of chain stays or chain stay assembly 66 offset rear axle 64 from a crankset 68. A drive system 67 generally includes a crankset 68 that includes a pair of pedals 70 that are operationally connected to a chain 72 via a single or group of chain rings or sprockets 74. Rotation of chain 72 of drive system 67 communicates a drive force to a gear cluster 78 positioned at a rear section of bicycle 10. Gear cluster 78 is generally concentrically orientated with respect to rear axle 64 and can include a number of variable diameter gears.

Gear cluster 78 is operationally connected to a hub 80 of rear wheel assembly 60. A number of spokes 82 extend radially between hub 80 and a rim 81 of rear wheel assembly 60. A tire 69 is positioned about rim 81 or rear wheel assembly 60. As is commonly understood, rider operation of pedals 70 drives chain 72 thereby driving rear tire 69 which in turn propels bicycle 10.

Bicycle 10 includes a rear wheel brake system 84 having a caliper 86 and a pair of brake pads 88 that are positioned on generally opposite lateral sides of rim 81. A cable 90 extends between caliper 86 and a rear brake lever 92 that positioned proximate handlebar 16. Rider manipulation of rear brake lever 92 biases brake pads 88 into engagement with rim 81 so as to slow or stop rotation of rear tire 69. As used herein, frame 12 includes those portions of bicycle 10 associated with supporting a rider between front and rear wheel assemblies 36, 60. That is, frame assembly 12 includes seat and chain stay assembly 65, 66, seat tube 22, top tube 24, down tube 26, bottom bracket 27, and head tube 28. The handle bars and fork assembly associated with front wheel assembly 36 are generally rotatably connected to frame assembly 12. Rear wheel assembly 60 and drive system 67 are connected to bicycle frame assembly 12 in a manner that allows driven operation of the rear wheel assembly 60 via rider interaction with drive system 67.

Although bicycle 10 is shown as what is commonly understood as a street or road bicycle, it is appreciated that bicycle 10 could be provided in either of a road bicycle of mountain or off-road or trail bicycle configuration. It is appreciated that each configuration includes features generally directed to the intended operating environment of the bicycle. For example, trail or mountain bicycles generally include more robust suspension and tire systems than road bicycles. It is further appreciated that the frame assembly of the present invention is equally applicable to stationary bicycles.

FIGS. 2 and 3 show respective plug or male portions and socket or female portions of joint 14 separated from one another. As shown in FIG. 2, seat stay assembly 65 includes laterally opposite stay arms 100, 102 that form an opening 104 constructed to accommodate rear wheel assembly 60. Each stay arm 100, 102 includes a lower end 106 that is constructed to cooperate with axle 64 of rear wheel assembly 60.

Stay arms 100, 102 are connected at an upper end 108 that forms a first portion or male portion 110 of joint 14. Male portion 110 includes a number of shelves or steps 112, 114, 116 that extend circumferentially about male portion 110. First step 112 extends in a longitudinal direction, indicated by axis 119, and is formed between a distal or terminal end 118 of male portion 110 and a first ledge, wall, or rise 120. Second step 114 also extends in a longitudinal direction relative to axis 119 and is formed between first rise 120 and a second rise 122. Third step 114 also extends in a longitudinal direction relative to axis 119 and is formed between second rise 122 and a third rise 124.

Terminal end 118 and each of rises 120, 122, and 124 extend in a crossing direction relative to steps 112, 114, 116. Terminal end 118 forms a rise between first step 112 and an interior surface 130 of male portion 110 whereas rise 124 extends between third step 116 and an outer or exterior surface 132 of stay assembly 65. Preferably, each step 112, 114, 116 extends a similar length in directions aligned with axis 119 although steps 112, 114, 116 could be provided with different lengths. First step 112 have a smaller circumferential length than second step 114, second step 114 has a smaller circumferential length than third step 116, and third step 116 has a smaller circumferential length that exterior surface 132 at a position proximate third rise 124.

Male portion 110 of joint 14 telescopically or slidably cooperates with a socket or female portion 140, as shown in FIG. 3, of each pair of ends that form a respective joint 14. As shown in FIG. 3, female portion 140 extends in a rearward direction of seat tube 22 so as to cooperate with male portion 110 such that seat stay assembly 65 extends in a rearward and downward direction relative to seat tube 22. Female portion 140 includes a cavity or pocket 142 that receives the multiple steps 112, 114, 116 of male portion 110 of seat stay assembly 65. Female portion 140 includes a number of shelves or steps 144, 146, 148 that are separated by a number of ledges, ridges, or walls 150, 152, 154 that are formed between adjacent steps 144, 146, 148.

Step 144 extends between a distal or terminal end 157 of female portion 140 and wall 150, step 146 extends between wall 150 and wall 152, and step 148 extends between wall 152 and wall 154. Each of steps 144, 146, 148 extend in a direction generally aligned with a longitudinal axis 156 of female portion 140 and each of terminal end 157 and walls 150, 152, 154 extend in a crossing direction relative to each of steps 144, 146, 148. Said in another way, terminal end 157 and walls 150, 152, 154 are generally aligned with radial lines extending from axis 156. Preferably, terminal end 157 and walls 150, 152, 154 are oriented to be generally perpendicular to steps 144, 146, 148. Walls 150, 152, 154 are space along axis 156 similar to the spacing of rises 120, 122, 124 along axis 119 of male portion 110. Understandably, the steps or shelves of a first portion of a respective joint could be generally perpendicular to the steps or shelves of a second portion of the same joint provided such an orientation does not unduly interfere with the telescopic or slidable interaction associated with assembly of the joint. Alternatively, each joint portion could be provided with a slight draft to aid with the generally guided interaction between the male and female or plug and socket portions of the respective joint.

Step 144 has a circumferential length that is generally similar to the circumferential length of step 116 of male portion 110, step 146 has a circumferential length that is generally similar to the circumferential length of step 114, and step 148 has a circumferential length that is generally similar to the circumferential length of step 112. Whereas upper end 108 of stay assembly 65 tapers, or has a gradually reducing cross-sectional shape in a direction toward terminal end 118, female portion 140 of joint 14 tapers, or has a stepped or gradually reducing cross-sectional shape in a direction away from terminal end 157 of female portion 140. Understandably, the respective frame tubes and joint portions can have virtually any shape provided that at least the corresponding joint portion has a shape that cooperatively mates with the first joint portion.

When male portion 110 of stay assembly 65 and female portion 140 are connected, an interior surface 160 of female portion 140 is substantially aligned with interior surface 130 of male portion 110. Similarly, an exterior surface 162 of female portion 140 and exterior surface 132 of stay assembly 65 are also aligned when male portion 110 and female portion 140 of joint 14 are connected. As clearly shown in FIGS. 2 and 3, joint 14 is formed between male and female portions 110, 140 having a non-circular, oblong, or elliptical cross-sectional shape. Understandably, joint 14 could be formed by members having cross-sectional shapes other than that shown such as generally circular shape.

As shown in FIG. 3, another joint 170 is formed generally forward of seat tube 22 and forms a connection between seat tube 22 and top tube 24. The construction of joint 170 is substantially similar to the construction of joint 14. However, unlike joint 14 which includes female portion 140 extending from seat tube 22, joint 170 includes a male portion 172 that extends forward from seat tube 22 and a female portion 174 that is formed in a rearward facing end 176 of seat tube 22. Like joint 14, male portion 172 of joint 170 includes a number of steps 178, 180, 182 that are separated by a number of rises 184, 186, 188 and female portion 174 includes a number of steps 190, 192, 194 that are separated by a number of walls 196, 198, 200.

When connected, a terminal end 202 of female portion 174 abuts against rise 188 of male portion 172 and a terminal end 204 of male portion 172 abuts against wall 200 of female portion 174. Understandably, although seat tube 22 is shown to include rearward facing female portion 140 and forward facing male portion 172, it is appreciated that each of female portion 140 and male portion 172 could be formed as a male portion and a female portion of joints 14, 170 provided the respective ends of seat stay assembly 65 and/or top tube 24 where similarly reversed. Although only the connections between seat tube 22 and seat stay assembly 65 and seat stay assembly 65 and top tube 24 are shown in the drawings, it is appreciated that one or more of the remaining frame connections such as between seat tube 22 and bottom bracket 27 or down tube 26, between down tube 26 and head tube 28, and between top tube 24 and head tube 28 could be constructed in manner similar to joints 14 or 170. It is further appreciated that the male and female portions of any of the frame connections discussed above could be provided on any of the respective frame tube members providing the adjoining tube members are provided with the opposite joint portion.

FIG. 4 shows a radial cross section of joint 14 taken along line 4-4 shown in FIG. 2. As discussed above, it is appreciated that one or more of the frame assembly connections can be provided in the multiple step and multiple lap configuration of joint 14. As shown in FIG. 4, when connected, terminal end 118 and rises 120, 122, 124 of male portion 110 each abut a respective one of walls 154, 152, 150, and terminal or distal end 157 of female potion 140. Steps 144, 146, 148 of female portion 140 generally overly a respective step 116, 114, 112 of male portion 110. When connected, exterior or outer surface 132 of male portion 110 is generally aligned with or coplanar to an exterior or outer surface 210 of female portion 140. Preferably, interior surface 130 of male portion is also generally aligned with or coplanar to interior surface 160 of female portion 140. It is appreciated that either of male or female portions 110, 140 could be provided in a solid bodied configuration. It is understood that the solid portion of female portion 140 of joint 14 would terminate proximate wall 154 of female portion 140 so to not interfere with engagement of male portion 110 therewith. It is further appreciated that each of male portion 110 and female portion 140 could be provided with a second multiple step and lap joint configuration that extends towards the centerline of the respective joint assembly. Although such an arrangement would increase the bondable surface area associated with joint 14 as discussed below, such a configuration would also increase the weight associated with joint 14.

The longitudinally elongated and multiple stepped configuration of joint 14 increases the surface area available for bonding the male and female portions of joint 14 and provides for a robust joint connection that can withstand the rigors of bicycle operation and which exhibits improved structural integrity to weight ratios as compared to previous frame joint and connection methodologies. Joints 14, 170 communicate a majority of the load associated with the connection away the distal ends of the respective members that form the male and female portions of the respective joints. Such a construction reduces the potential of finish blemishes at an interface 212 (FIG. 4) between the exterior surfaces 132, 210 of the male and female portions 110, 140 of joint 14.

The construction of joints 14, 170 also allows for relative matching of the stiffness of each of the respective portions of the joint. The similar shape, cross-sectional area, and material of male and female portions 110, 140 allows both members of a respective joint pair to flex in a more uniform manner across the joint thereby reducing the potential of finish failure such paint peeling and/or cracking. It is appreciated that the material, thicknesses, and lay-ups assemblies can be altered in a manner that maintains a fairly uniform stiffness across the joint assembly so as to avoid such finish failures. That is, one of the portions of joint 14, 170 could be constructed of a first material having a first stiffness and the other portion of each joint 14, 170 could be constructed of a second material having a greater stiffness but a thinner construction. Preferably, each step is formed by two plys or layers of material, such as carbon-fiber based materials, and each male portion and female portion has similar constructions. Furthermore, unlike other joint assemblies that rely on one or more exterior wraps to be positioned about the respective ends of the joint portions, each joint 14, 170 according to the present invention has only one interface 212 at the external surface of the joint assembly. The male/female construction of joints 14, 170 simplifies assembly and construction of the respective frame members as compared to previous joint methodologies and provides a joint that is lightweight, robust, and resists degradation of the appearance of the joint during use of a bicycle so equipped.

It is further appreciated that each of joints 14, 170 could be provided with different numbers of corresponding steps and/or ledges or rises. Although each joint portion of joints 14, 170 is shown as having three steps, joints having other numbers of steps are envisioned. Understandably, thicker wall portions would accommodate a greater number of steps as would smaller dimensions of the rise between adjacent steps. Preferably, in those embodiments having more than three steps, the distal end steps of the joint portions are longer than the steps disposed therebetween.

Therefore, one embodiment of the invention includes a bicycle frame assembly having a seat tube and a head tube that is generally aligned with and horizontally offset from the seat tube. The frame assembly includes at least one horizontal tube that extends between the seat tube and the head tube and a seat stay assembly that extends rearward from the seat tube. A chain stay extends rearward from the seat tube at a position generally under the seat stay. The frame assembly includes a joint that is formed between at least two of the seat tube, head tube, horizontal tube, seat stay assembly and chain stay. The joint includes a male portion and a female portion that overlap one another. The male portion has at least three steps of gradually increasing diameter as determined in a direction moving away from a distal end of the male portion. Each step is separated by a rise that is generally perpendicular to, and formed between, adjacent steps. The joint includes a female portion having at least three steps that are each separated by a rise. The steps and rises of the female portion are oriented in a substantially similar manner as the steps and rises of the male portion so that both of the steps and the rises of the male and female portion can be bonded together.

Another embodiment combinable with one or more of the aspects of the above embodiment includes a bicycle assembly having a seat, a handlebar, a rear wheel positioned proximate the seat, and a front wheel positioned proximate the handlebar. The bicycle assembly includes a frame that is formed by a number of connected members that support the seat, the handlebar, the rear wheel, and the front wheel. A joint is formed between at least two of the connected members and is formed by a first portion and a second portion that cooperate with one another in a telescopic manner. The joint includes a first, a second, and a third shelf that are formed along an outer surface of the first portion and have gradually increasing circumferences in a direction away from a distal end of the first portion. A fourth, a fifth, and a sixth shelf are formed along an inner surface of the second portion and have gradually reducing circumferences in a direction away from a distal end of the second portion. A wall is formed between each adjacent shelf such that each wall and each shelf of the first portion can be bonded to a corresponding shelf and a corresponding wall of the second portion.

Another embodiment combinable with one or more of the aspects of the above embodiments includes a method of forming a bicycle frame having a number of connected members that include a top tube, a bottom tube, a seat tube, a pair of seat stays and a pair of chain stays. The method includes providing a first frame member having an end portion whose cross-sectional shape gradually reduces in a direction toward a distal end of the first frame member in a tapered manner from an outer surface to a first step surface, from the first step surface to a second step surface, from the second step surface to a third step surface, and from the third step surface to an interior surface of the first frame member. A ridge is formed between each of the outer, first, second, and third step surfaces, and the third step surface and the interior surface so that each ridge extends in a direction that is generally transverse to adjacent surfaces. A second frame member is provided that includes an end portion constructed to snuggly receive the end portion of the first frame member. The end portion has an opening whose cross-sectional shape gradually reduces in a direction away from a distal end of the second frame member so that an outer surface of the second frame member is aligned with the outer surface of the first frame member and an interior surface of the second frame member is aligned with the interior surface of the first frame member. Each of the first, second, and third surfaces and each ridge of the first frame member are bonded to a corresponding surface of the second frame member so that the interior and exterior surfaces of the joint are generally continuous and coplanar with respect to the bonded frame members.

The present invention has been described in terms of the preferred embodiments, and it is recognized that equivalents, alternatives, and modifications, aside from those expressly stated, are possible and within the scope of the appending claims. It is further appreciated that the respective features of any one of the embodiments discussed above is not necessarily solely exclusive thereto.

What we claim is:

1. A bicycle frame assembly comprising:
   a seat tube;
   a head tube generally aligned with the seat tube and horizontally offset therefrom;
   at least one horizontal tube that extends between the seat tube and the head tube;
   a seat stay assembly that extends rearward from the seat tube;
   a chain stay that extends rearward from the seat tube generally under the seat stay; and
   a joint formed between at least two of the seat tube, head tube, horizontal tube, seat stay assembly and chain stay, the joint having a male portion and a female portion that overlap one another;
   the male portion having at least three steps of gradually increasing diameter in a direction moving away from a distal end of the male portion, each step being separated by a rise that is generally perpendicular to and formed between adjacent steps;
   the female portion having at least three steps that are each separated by a rise, the steps and rises of the female portion oriented in a substantially similar manner as the steps and rises of the male portion so that both of the steps and the rises of the male and female portion can be bonded together.

2. The bicycle frame assembly of claim 1 wherein the male portion and the female portion have a generally elliptical shaped cross-section.

3. The bicycle frame assembly of claim 1 wherein at least one of the male portion and the female portion is hollow.

4. The bicycle frame assembly of claim 1 wherein the joint is formed between the seat stay assembly and the seat tube and another joint is formed between the seat tube and the at least one horizontal tube.

5. The bicycle frame assembly of claim 4 wherein the seat tube includes the female portion and the seat stay assembly includes the male portion of the joint and the seat tube includes the male portion and the at least one horizontal tube includes the female portion of the another joint.

6. The bicycle frame assembly of claim 5 wherein the female portion and the male portion of the seat tube are formed as a pocket and a projection, respectively, that extend in generally opposite outward directions relative to a longitudinal axis of the seat tube.

7. The bicycle frame assembly of claim 1 wherein an outer diameter of the male portion is substantially similar to an outer diameter of the female portion.

8. The bicycle frame assembly of claim 7 wherein the male portion and the female portion are constructed of the same material.

9. The bicycle frame assembly of claim 1 wherein each step, when measured in a cross-sectional plane, is about three times as long as each rise is high.

10. A bicycle assembly comprising:
    a seat;
    a handlebar;
    a rear wheel positioned proximate the seat and a front wheel positioned proximate the handlebar;
    a frame formed by a number of connected members to support the seat, the handlebar, the rear wheel, and the front wheel;

a joint between at least two of the connected members, the joint formed by a first portion and a second portion that cooperate with one another in a telescopic manner;

a first shelf, a second shelf, and a third shelf that are formed along an outer surface of the first portion and have gradually increasing circumferences in a direction away from a distal end of the first portion;

a fourth shelf, a fifth shelf, and a sixth shelf that are formed along an inner surface of the second portion and have gradually reducing circumferences in a direction away from a distal end of the second portion; and a wall formed between each adjacent shelf such that each wall and each shelf of the first portion can be bonded to a corresponding shelf and a corresponding wall of the second portion.

11. The bicycle assembly of claim 10 wherein each wall extends in a direction that is generally transverse to an axis associated with the telescopic manner.

12. The bicycle assembly of claim 10 wherein the each wall is shorter than each shelf.

13. The bicycle assembly of claim 12 wherein each of the shelves have a common depth.

14. The bicycle assembly of claim 10 wherein each of the first portion and the second portion have non-circular cross sections.

15. The bicycle assembly of claim 10 wherein the first portion and the second portion are bonded together and have the same outer diameters.

16. A method of forming a bicycle frame having a number of connected members that include a top tube, a bottom tube, a seat tube, a pair of seat stays and a pair of chain stays, the method comprising:

providing a first bicycle frame member having an end portion whose cross-sectional shape gradually reduces in a direction toward a distal end of the first bicycle frame member in a tapered manner from an outer surface to a first step surface, from the first step surface to a second step surface, from the second step surface to a third step surface, and from the third step surface to an interior surface of the first bicycle frame member;

forming a ridge between each of the outer, first, second, and third step surfaces, and the third step surface and the interior surface wherein each ridge extends in a direction that is generally transverse to adjacent surfaces;

providing a second bicycle frame member having an end portion that is constructed to receive the end portion of the first bicycle frame member, the end portion having an opening whose cross-sectional shape gradually reduces in a direction away from a distal end of the second bicycle frame member so that an outer surface of the second bicycle frame member is aligned with the outer surface of the first bicycle frame member and an interior surface of the second bicycle frame member is aligned with the interior surface of the first bicycle frame member; and bonding each of the first, second, and third surfaces and each ridge of the first bicycle frame member to a corresponding surface of the second bicycle frame member.

17. The method of claim 16 further comprising forming each step with a similar length.

18. The method of claim 17 further comprising forming each ridge with a similar height.

19. The method of claim 18 wherein the length of each step is approximately four times as great as the height of each ridge.

20. The method of claim 19 wherein each end portion is formed to have an oblong cross-sectional shape.

* * * * *